Oct. 1, 1935.  H. H. TWENTE  2,015,879
CONVERTIBLE WAGON BED
Filed Aug. 16, 1933   5 Sheets-Sheet 5
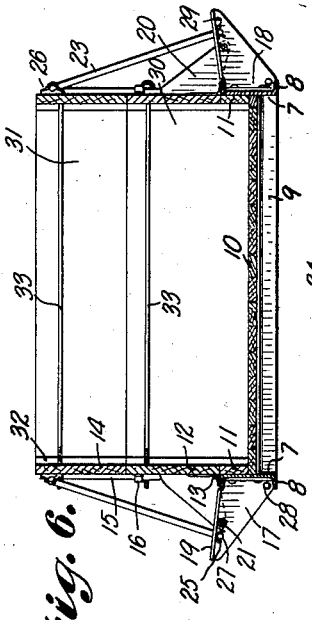
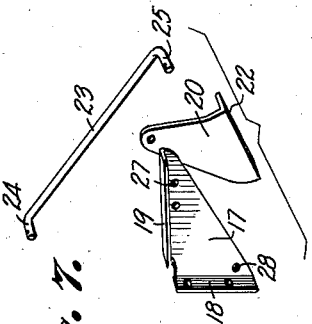
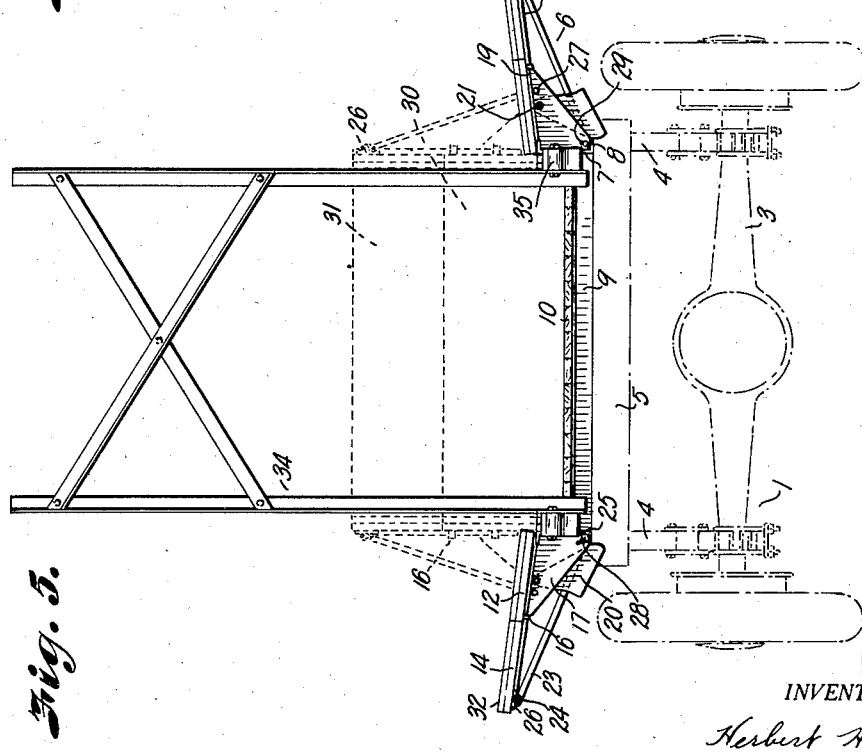
INVENTOR.
Herbert H. Twente Patented Oct. 1, 1935

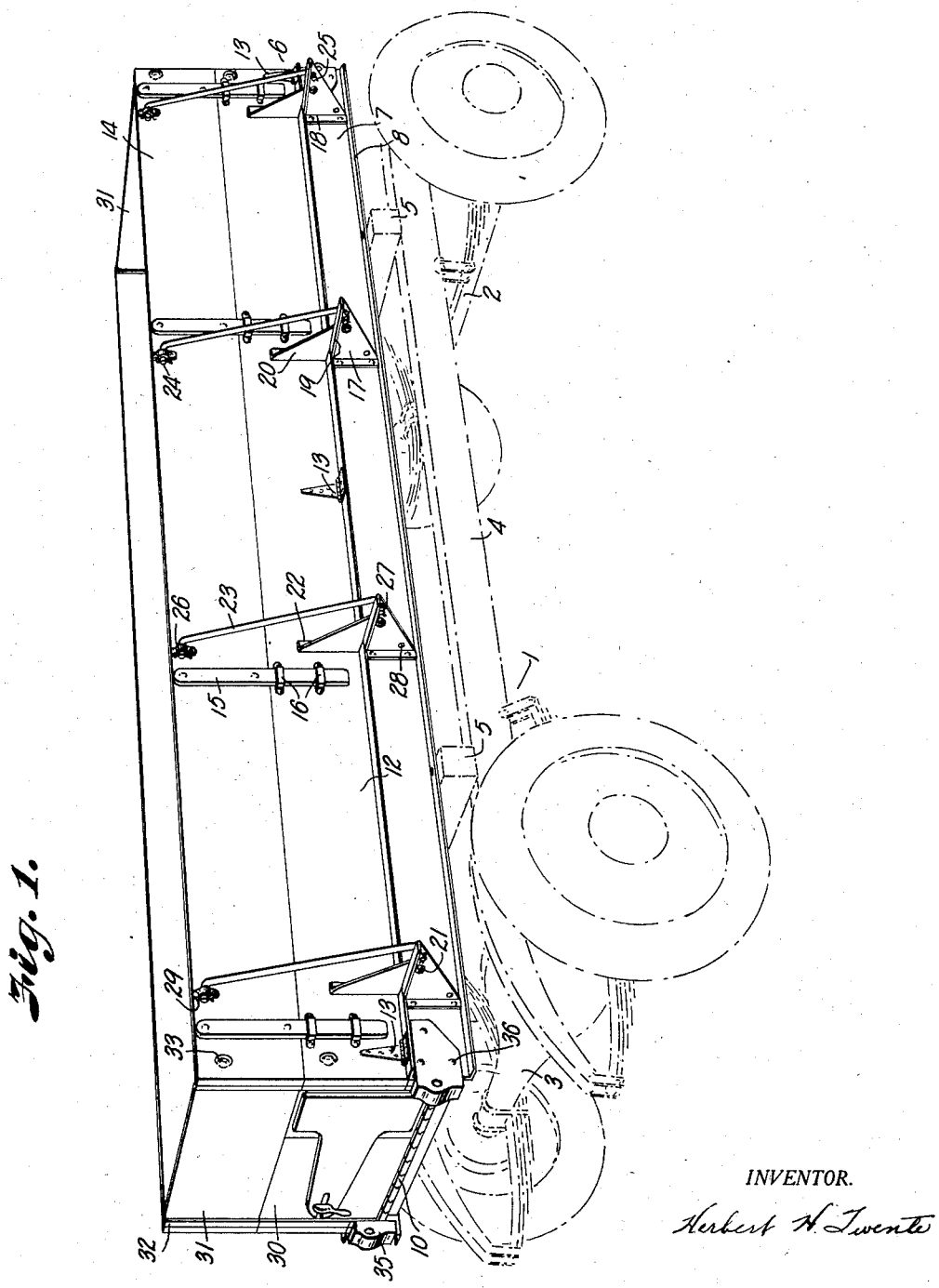

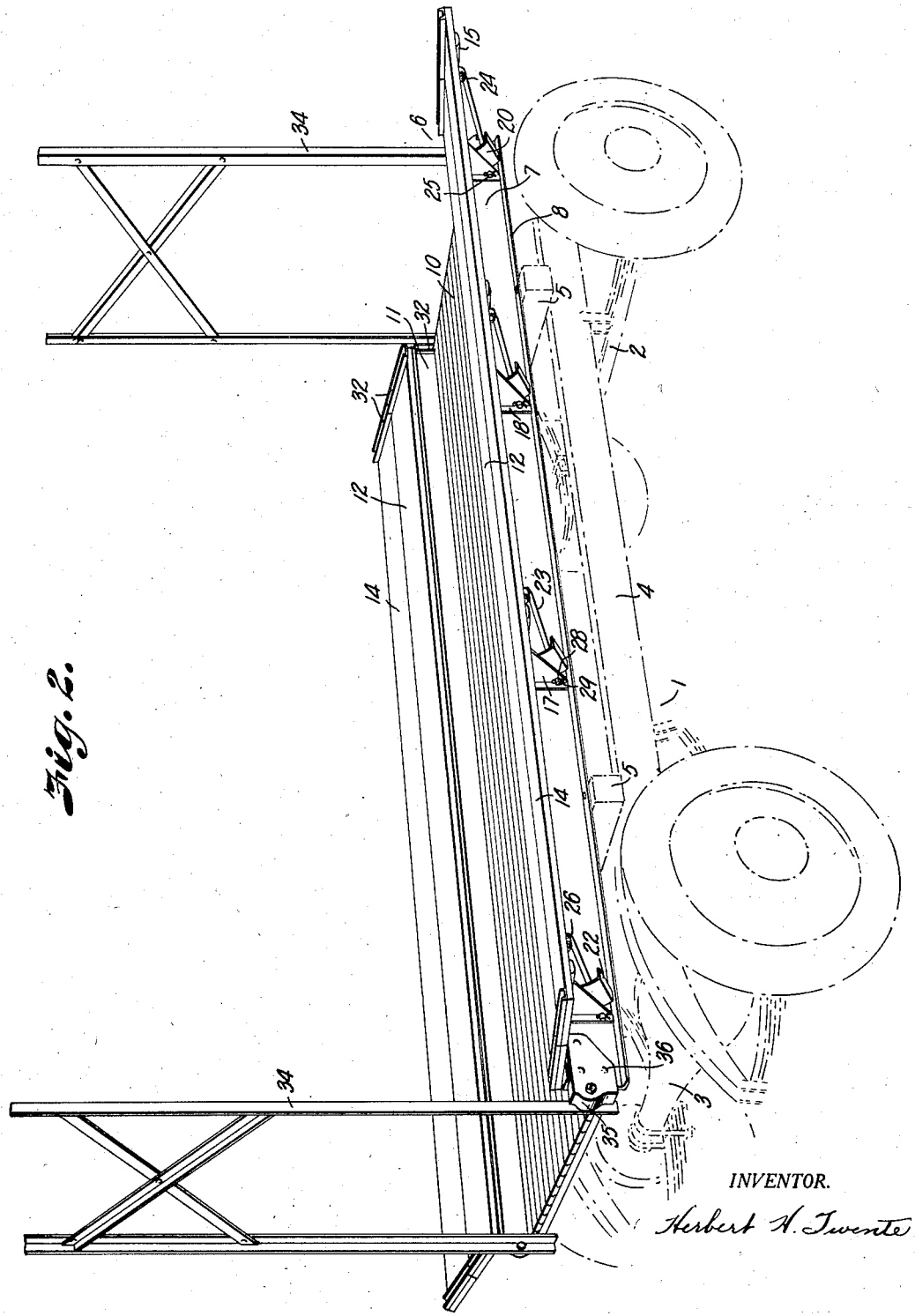

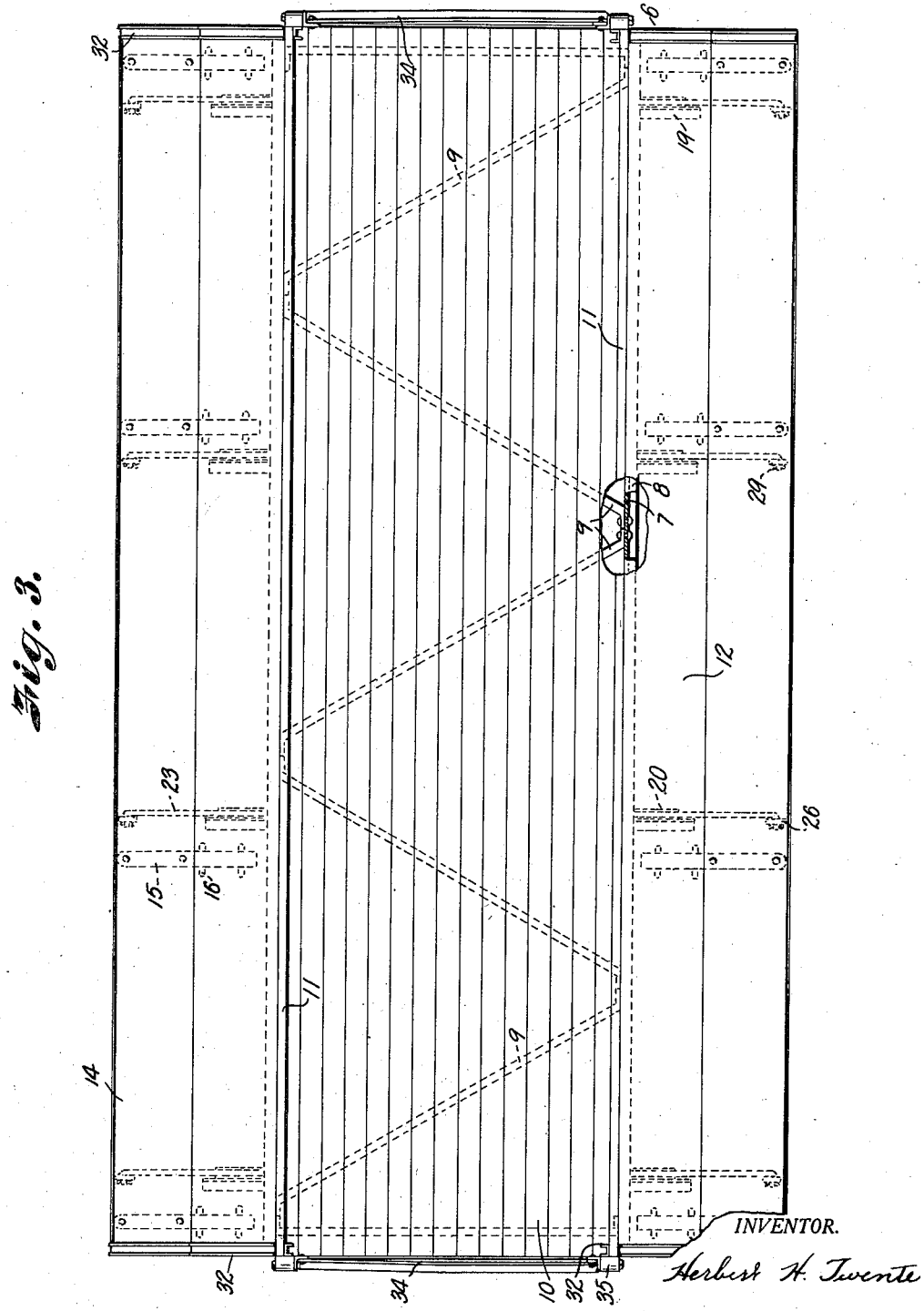

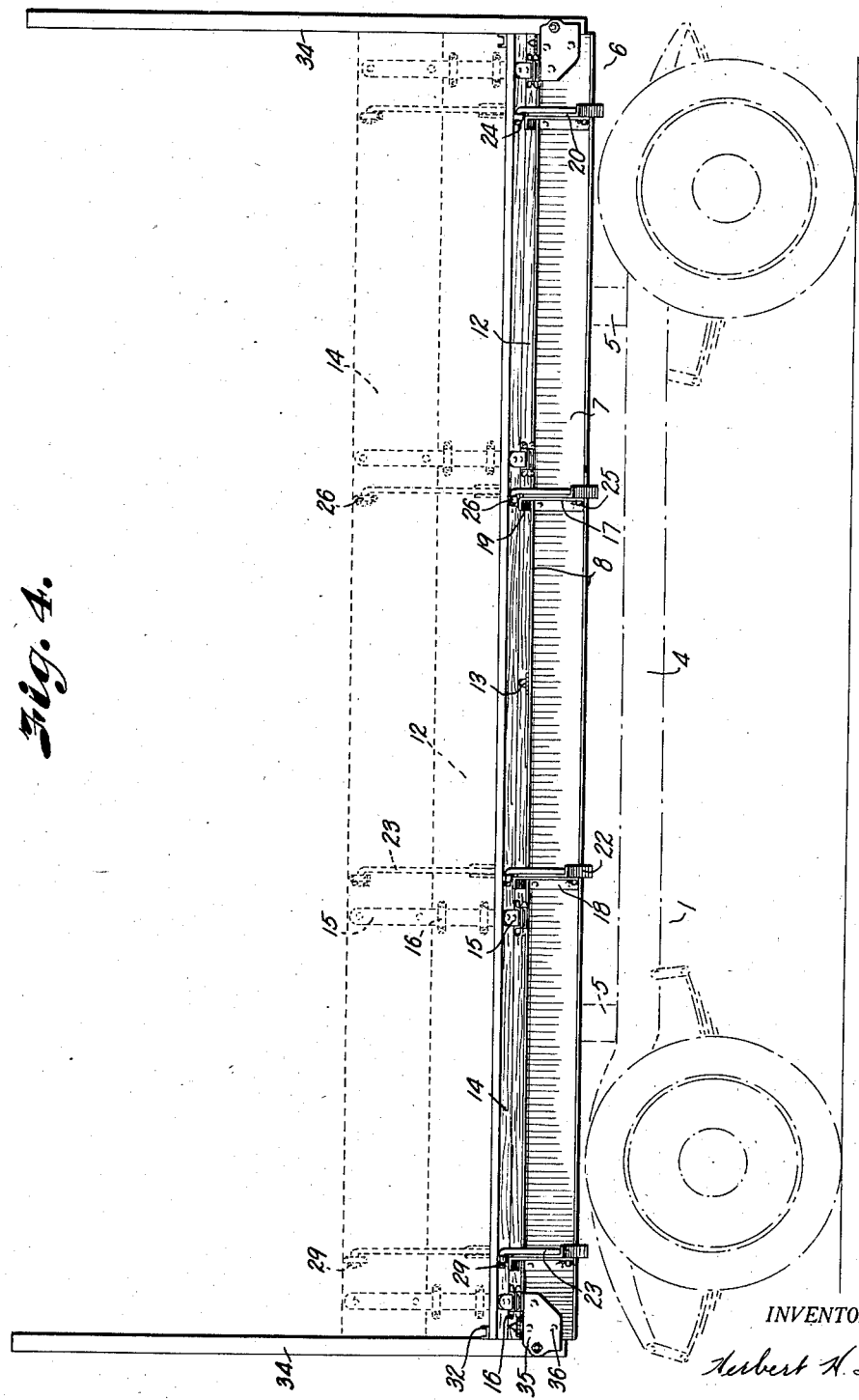

2,015,879

UNITED STATES PATENT OFFICE 2,015,879

CONVERTIBLE WAGON BED

Herbert H. Twente, Independence, Mo.

Application August 16, 1933, Serial No. 685,368

6 Claims. (Cl. 296—10)

My invention relates to vehicles and more particularly to a convertible wagon bed.

It is common practice for farmers to have a wagon provided with a grain-tight bed for hauling threshed grain or the like, and another wagon equipped with a rack for hauling hay or bundles of grain. Occasionally it is necessary to remove the grain bed from one wagon and replace it with the rack or vice versa, an operation that requires heavy lifting.

In recent years discarded automobile chassis have come into general use both as trailers and as horse-drawn vehicles for carrying grain beds, principally because they can be drawn with much less power than the common type of running gear, and for the further reason that the rubber tired vehicle is far more practical, especially on rough or paved roads.

The principal object of my invention is, therefore, to provide a wagon bed comprising a combination grain-tight box and hay or bundle rack which can be easily and quickly converted from one form to the other.

Another object is to provide means for rigidly bracing the upper and lower side boards of the wagon bed independently of each other.

A further object of the invention is to provide apparatus of this character adapted particularly for mounting on an automobile chassis.

These and other objects of my invention I accomplish with structure shown in detail in the accompanying drawings wherein:

Fig. 1 is a perspective view of the convertible wagon bed arranged to form a grain tight box.

Fig. 2 is a perspective view showing the bed converted into a hay rack.

Fig. 3 is a plan view of the rack.

Fig. 4 is a side elevation indicating in full lines the form of the rack and in dotted lines the form of the box.

Fig. 5 in like manner discloses a rear elevation of the vehicle.

Fig. 6 is a cross section of the grain box.

Fig. 7 is a detail perspective view of a supporting bracket and bracing members in disassembled relation.

Fig. 8 is a fragmentary elevational view showing a side board held in raised position by a supporting bracket modified slightly to engage a wooden sill.

Fig. 9 is a similar view showing the side board in lowered position.

Referring in detail to the drawings:

1 designates an automobile chassis having the usual front axle 2 and rear axle housing 3 connected by frame members 4. Cross sills 5 are commonly used to bridge the frame members for supporting a wagon box or the like.

6 designates generally the wagon bed comprising my invention and includes a pair of sills 7, preferably channel irons set on edge with their flanges 8 directed outwardly. The sills 7 may be connected and spaced by angularly positioned cross bars 9 bolted or welded to the sills, or secured in any other manner insuring a rigid sub-structure for the bed.

A floor 10 is laid on the cross bars 9 and mounted on the floor in juxtaposed relation to the sills 7 are base boards 11 having upper edges approximately flush with the upper flanges of the sills.

Arranged immediately above the base boards and seated thereon are lower side boards 12 preferably anchored to the sills by hinges 13 secured to the side boards and the sills in such a manner that the side boards may swing outwardly but are prevented from inward swinging movement by the engagement of the sideboards with the base board. Upper side boards 14 may be seated on the lower side boards and held in assembled relation therewith by strips 15 fixed to the upper boards and projected through stirrups 16 secured to the lower side boards as in common practice.

In order to hold the side boards in either upright or reposed position I have provided bracing apparatus including supporting brackets 17 having lateral flanges 18 riveted or otherwise secured to the webs of the sills. The brackets 17 are preferably triangular in shape and have upper inclined bearing edges or flanges 19 serving as rests for the lower side boards when the latter are swung downwardly.

Brace arms 20 are attached by bolts 21 or the like to the brackets and are free to pivot on the bolts so that they may be swung upwardly to bracing engagement with the lower side boards or turned downwardly to permit lowering of the side boards onto the supporting brackets. It is desirable to form lateral flanges 22 on the brace arms to provide a wider bearing face for engaging the lower side boards, the lower edge of the flange and arm being supported on the sill.

For supporting the upper side boards in both elevated and lowered positions brace rods 23 are provided having laterally bent ends or hooks 24 and 25, the ends 24 being seated in bearing brackets 26 fixed to the upper side boards and the hooks 25 being inserted in apertures 27 of the supporting brackets when the upper side boards are raised, or in apertures 28 when the side boards are lowered. Cotter pins 29 are preferably used for retaining the rod ends in assembled relation with the bearings and brackets.

When the structure is to be used as a grain box the ends of the box may be closed by lower and upper end gates 30 and 31 slidably mounted in channel iron sections 32 fixed to the base boards and lower and upper side boards in aligned relation to each other. End gate rods 33 are further employed in the usual manner to tie the sides of the box together.

When using the structure as a hay rack the end gates are temporarily discarded and ladders 34 are pivotally secured between bearing plates 35 fastened as by rivets 36 to the outer faces of the sill webs.

From the foregoing description it will be apparent that when the wagon bed is to be used for hauling threshed grains, etc. the side boards are hinged upwardly, the brace arms are swung into position against these boards, and the lower hooks on the brace rods are inserted in the apertures 27 of the supporting brackets and keyed in place by cotter pins. The end gates are next seated between the sides of the box and held in this position by the end gate rods. It will be obvious that, if desired, the upper side boards and end gates may be entirely removed since the arms 20 serve to brace the lower side boards independently of the brace rods.

When the box is to be converted into a hay or bundle rack the end gate rods and end gates are first removed. Thereupon the lower hooks of the brace rods are withdrawn from the apertures 27, the brace arms are swung downwardly and the lower hooks are inserted in the openings 28.

As will be clear, particularly from Fig. 2, the brace rods thus serve to substantially lock the brace arms in place and prevent excessive swinging thereof when not in use. The ladders are finally attached to their bearings to complete the rack. In the latter form of bed the upper or outer side boards may be dispensed with if a rack of less width is desired.

A distinct advantage in a rack constructed as described over those commonly used is that the entire floor is grain-tight so that in hauling bundles the grain threshed therefrom during such operations is not lost. To further insure this saving a narrow end gate may be mounted at each end of the bed between the base boards.

In the modified form shown in Figs. 8 and 9 the supporting brackets 38, corresponding to the brackets 17 of the preferred form, are shaped to fit against the plane side face of a wooden sill 39, the remaining structure being almost identical to that previously described, with the exception that the brace arm 40 rests firmly against the brace rod 41 when the side board 42 is down, thus positively preventing swinging of the brace arm while in this position.

It will thus be apparent that I have provided a practical wagon bed that will serve both as a grain box and as a hay rack and that may be quickly and easily converted from one form to the other. As will further be obvious it could be adapted to a truck as readily as to a wagon or automobile chassis.

What I claim and desire to secure by Letters Patent is:

1. Apparatus of the character described including a sill, a lower and an upper side board in hinged relation to the sill, a bracket extending laterally from the sill for supporting the lower side board in lowered position, a rod pivoted to the upper side board and arranged for engagement with the bracket at spaced points for supporting the upper side board in lowered and raised positions, and an arm pivoted to the bracket having a bearing face for abutting the lower side board when in raised position and for resting on said rod when the rod supports the upper side board in lowered position.

2. In apparatus of the character described including a pair of sills, a floor closing the space between the sills, base boards adjacent the sills, side boards hingedly mounted on the sills for outward swinging movement and adapted to seat on the base board when in upright position, and means engaging the side boards for preventing outward movement thereof and for cooperating with the base board for supporting the sideboard in upright position.

3. In apparatus of the character described, a pair of sills, a floor between the sills, a sideboard hingedly associated with each sill, brackets on said sills for supporting the sideboards in lowered position, and means pivoted to said brackets at a point in spaced relation with the sills and supported by the sills and arranged for abutting engagement with the sideboards for supporting the sideboards in raised position.

4. In apparatus of the character described including a sill, a sideboard, a hinge connecting the sideboard to the sill, a bracket extending laterally from the sill for supporting the sideboard in lowered position, and an arm pivoted to the bracket at a point spaced from the sill, and arranged for abutting engagement with the sideboard for supporting said sideboard in upright position, said arm having a bearing face including a portion abutting the sideboard adjacent its lower edge to relieve the hinge of pressure exerted outwardly against the sideboard.

5. In apparatus of the character described including a sill, a sideboard, a hinge connecting the sideboard to the sill, a bracket extending laterally from the sill for supporting the sideboard in lowered position, and an arm pivoted to the bracket at a point spaced from the sill and arranged for abutting engagement with the sideboard for supporting the sideboard in upright position, said arm having a bearing face extending across the greater portion of the width of said sideboard.

6. In apparatus of the character described including a sill, aligned lower and upper sideboards in hinged relation to the sill, a bracket extending laterally from the sill for supporting the lower sideboard in lowered position, an arm pivoted to said bracket for supporting the lower sideboard in raised position, and means on the upper sideboard engaging said bracket at a point spaced outwardly from the pivoted arm for supporting the upper sideboard in raised position and at a point spaced downwardly and inwardly from said last-named point for supporting the upper sideboard in lowered position.

HERBERT H. TWENTE.